United States Patent Office 3,322,763
Patented May 30, 1967

3,322,763
N,N',N''-SUBSTITUTED MELAMINE DERIVATIVES
Joachim Dazzi, Riehen, and Ernst Keller, Binningen, Basel-Land, Switzerland, assignors to Geigy Chemical Corporation, Greenburgh, N.Y., a corporation of Delaware
No Drawing. Filed Oct. 12, 1965, Ser. No. 495,302
Claims priority, application Switzerland, July 7, 1961, 8,131/61
9 Claims. (Cl. 260—249.6)

This application is a continuation-in-part of our copending application Ser. No. 249,119, filed Jan. 3, 1963, now abandoned, which in turn is a continuation-in-part of application Ser. No. 208,124, filed July 6, 1962, now abandoned The present invention concerns N,N',N''-substituted melamine derivatives which contain more than one 1,3,5-triazine ring in the molecule, processes for the production thereof and their use as lubricants, dielectric media and functional fluids. The term "functional fluids" as used in this specification is meant to designate media employed to transfer mechanical and/or thermal energy which are fluid under the conditions of temperature and pressure at which they perform their intended function. As such the term includes hydraulic as well as heat transfer media.

The invention also concerns compositions of matter which contain at least one melamine derivative having more than one 1,3,5-triazine ring and at least one further substance from the series consisting of highly purified mineral oils, synthetic lubricant oils of an ester basis, silicone oils, antioxidants, thickeners, agents lowering the solidification point, high pressure additives and anticorrosives.

Very high demands with regard to heat and oxygen stability are made of synthetic lubricating agents and other functional fluids such as are used, for example, in apparatus and engines operating at high temperatures.

For such uses, synthetic lubricating agents and functional fluids must, in the first place, fulfill the following conditions:

(1) They must be capable of forming a lubricating film on the most various metals;
(2) They must have substantial stability to heat and must be difficult to volatilize;
(3) They should have a high flash point;
(4) They should not form any acid decomposition products;
(5) They should retain their mechanical, electrical and/or lubricating properties over as wide a temperature range as possible, e.g., their viscosity should be as little dependent as possible on temperature;
(6) They should have, in addition to these properties, as low a solidification point as possible.

It is difficult to find substances which fulfill these demands to such an extent that they can be employed as lubricants and/or functional fluids for high temperature engines.

It has now surprisingly been found that certain melamines suitably substituted at the nitrogen atom of the amino groups and which contain more of a 1,3,5-triazine ring in the molecule have many of the properties required above and thus can be used as functional fluids when high demands are made and as synthetic lubricants. The distinguishing characteristic of these new melamine derivatives is the presence of more than one 1,3,5-triazine ring in the molecule and the substitution of all amino groups by hydrocarbon radicals, advantageously by saturated hydrocarbon radicals, which may have inert substituents.

The melamine derivatives according to the invention are produced by reacting an organic polyamine having two or more acylatable amino groups, an amount of cyanuric halide which is equimolar to the number of its acylatable amino groups, and an amount which is double the equimolecular amount of this number of primary and/or secondary amines having aliphatic, aralphtic, alicyclic and mono- or poly-nuclear aromatic nitrogen substituents, which substituents may be further inertly substituted, and wherein the two nitrogen substituents of a secondary amine group can be bound to each other direct or can be bound by way of hetero atoms to form a ring. The reaction is performed in steps in any order desired under the usual conditions and in the presence of acid binding agents to form the corresponding N,N',N''-substituted melamine compounds having several 1,3,5-triazine rings and the components are advantageously so chosen that each 1,3,5-triazine ring contains at most one arylamino group.

A preferred method consists in reacting the organic polyamine having two or more acylatable amine groups with an amount equimolecular to the number of its acylatable amino groups of 6-halogen-2,4-diamino-1,3,5-triazines. These triazines are produced from a cyanuric halide by a method known per se by reacting it stepwise with 2 mols of primary and/or secondary aliphatic, araliphatic, alicyclic and saturated-heterocyclic amine, or they are produced from one mol of such an amine and one mol of a mono- or poly-nuclear aromatic amine in which all nitrogen substituents may have further inert substituents.

Advantageously polyamines of saturated or partly saturated hydrocarbon radicals which may contain inert substituents and hetero atoms as chain, bridging or ring members are used in the process according to the invention as organic amines having two or more acylatable amino groups. In addition they can contain hetero rings or can consist of hetero rings; in this case they are saturated hetero rings.

Examples of polyamines usable according to the invention are: alkylene di- and poly-amines such as ethylenediamine, 1,2- or 1,3-propylenediamine, 1,4-, 1,3- or 2,3-butylenediamine, 1,6-hexylenediamine, 1,10-decylenediamine, 1,18 - octadecylenediamine, 1,2,3-triaminopropane, N,N-bis-aminoethyl or N,N-bis-aminopropyl-alkylamines, -cycloalkylamines, -aralkylamines, and -phenylamines, diethylenetriamine, triethylenetetramine, tetraethylenepentamine; ether amines such as $\beta,\beta'$-diaminodiethyl ether, $\beta,\beta'$- or $\gamma,\gamma'$-diaminodipropyl ether, $\beta,\beta'$-diaminodiethyl glycol ether, $\beta,\beta'$-diaminodiethyl sulfide, $\gamma,\gamma'$-diaminodipropyl sulfide; cycloalkylenediamines such as 1,2- or 1,4-diaminocyclohexane, 4,4'-diaminodicyclohexyl, bis - (4'-aminocyclohexyl) - methane, 2,2-bis-(4'-aminoclohexyl)-propane or -butane, or 1,1-bis-(4'-aminocyclohexyl)-cyclohexane; or heterocyclic polyamines e.g. diazines such as piperazine, 2,5-dimethylpiperazine, 2,3,5,6-tetramethylpiperazine, 1-$\beta$-aminoethyl-, 1,$\beta$-aminopropyl- or 1,$\gamma$-aminopropylpiperazine, 1,4-bis-aminoethyl piperazine or 1,4-bis-$\gamma$-aminopropyl piperazine. The radicals of these polyamines may also contain alkyl groups such as methyl, ethyl, propyl, isopropyl, tert.butyl, tert.-amyl, iso-octyl, nonyl, dodecyl groups as branchings or substituents.

As amino compounds having only one acylatable amino group are used in the process according to the invention primary or secondary amino compounds having aliphatic alicyclic araliphatic or aromatic groups, in this case advantageously with mono- or poly-nuclear but not with condensed aromatic groups, or saturated or partly saturated nitrogen rings such as pyrrolidine, piperidine, hexamethyleneimine, morpholine and N-monoalkyl- or N-monoaralkyl-piperazines etc. Also in these amines, the organic nitrogen substituents can contain further inert substituents; for example, aliphatic radicals may contain alkoxy, alkylmercapto, phenoxy or phenylmercapto groups; cyclic and aromatic groups may contain alkyl substituents, and aromatic rings may further contain halogen such as fluorine, chlorine or bromine. Advantageously the nitrogen substituents of primary and secondary amines used according to the invention are saturated or partly saturated radicals, for example, normal or branched chain alkyl groups with 1 to 20 carbon atoms, cycloalkyl radicals such as cyclopentyl, cyclohexyl or alkylcyclopentyl radicals, tetrahydro- or decahydro-naphthyl radicals, abiethyl or dihydroabiethyl radicals.

Dialkyl-substituted mono-amines having 4 to 36 carbon atoms are particularly suitable for reducing the melting or solidification point of the end products. For example, diethylamine, di-n-butylamine, dihexylamine, di-2-ethyl-hexylamine, di-n-octylamine, di-n-decylamine, bis-n-dodecylamine, bis-n-hexadecylamine, bis-n-octadecylamine or dicyclohexylamine are employed. In addition to the mono- or poly-nuclear, advantageously non-condensed aromatic radical, aromatic amines contain, for example, in addition to the phenyl, monomethylphenyl, or dimethylphenyl, trimethylphenyl, 2,6-dibutylphenyl, 2,6-di-tert.-amyl-4-methylphenyl, diphenyl, benzylphenyl, phenoxyphenyl or phenylmercaptophenyl radical, as further nitrogen substituents preferably a lower alkyl group, e.g. the methyl, ethyl or n-butyl group.

The preferably used 2,4-bis-alkylamine-6-chloro- or -6-bromo-1,3,5-triazines, which are known because of their herbicidal action, are obtained by methods known per se by reacting two of the halogens of the cyanuric halide in the cold or at a moderately raised temperature with 2 mols of primary or 2 mols of secondary or 1 mol of primary and 1 mol of secondary monoamine. The reaction is performed in the presence of acid binding agents, possibly in inert organic solvents or diluents such as acetone, methylethylketone, dioxan, tetrahydrofurane, benzene, toluene, xylenes, chlorobenzene etc. The reaction of the third halogen with an acylatable amine is performed advantageously in the presence of pulverized caustic alkalies, at a raised temperature of, e.g. 80 to 240° C., either in the melt of the components or in an inert, anhydrous organic solvent e.g. in one of the aromatic solvents given above. It is advantageous if the first and/or the second halogen of the cyanuric halide is reacted with less reactive amines and the third halogen is reacted with an easily reacting amino group. In the first and second steps of the reaction of the cyanuric halide, also alkali metal salts of low fatty acids or alkali metal salts of polybasic, weaker inorganic acids, e.g. sodium or potassium carbonates, sodium or potassium bicarbonate, sodium or potassium acetates, trialkali metal salts of o-phosphoric acid and, in suitable form and amount, also alkali hydroxides as well as tertiary nitrogen bases such as pyridine, picolines, triethylamine or triethanolamine can be used as acid binding agents. In the last step of the halogen reaction of the triazine, instead of the acid binding agents mentioned, also an excess of the amine to be reacted can be used as acid binding agent. Further details regarding the reaction conditions can be seen from the following examples.

The melamine derivatives containing several 1,3,5-triazine rings according to the invention are of the formulas (I)          (II)

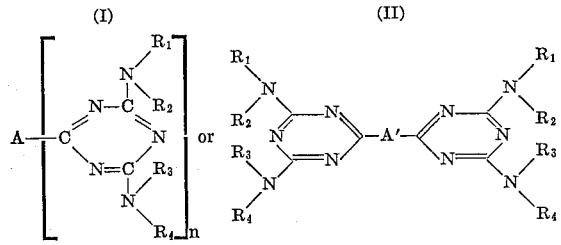

In these formulas, A is the n-valent radical of a saturated aliphatic hydrocarbon polyamine having a total of from 2 to 5 nitrogen atoms all of which are acylatable and are separated from each other by at least two carbon atoms, the total number of carbon atoms of which polyamine does not exceed 20, and which polyamine is selected from the group consisting of unsubstituted and lower alkyl-substituted open-chain, cyclic, and mixed cyclic- and open chain polyamines.

A′ is a divalent radical of a saturated aliphatic diaminoether having from one to two hetero atoms of an element selected from the group consitsing of oxygen and sulfur in the aliphatic portion between the amino groups, each amino group being separated from the next adjacent hetero atom by at least two carbon atoms, the total number of carbon atoms of which diaminoether does not exceed 20, said diaminoether being a member selected from the group consisting of unsubstituted and lower alkyl-substituted diaminoethers, $n$ is a positive integer ranging from 2 to 5, and each one of the two to five triazinyl moieties in the above formulas is linked to one of the said acylatable nitrogen atoms of A or A′, respectively.

Each of $R_1$ and $R_3$ is independently of the other either hydrogen or an alkyl group with maximally 18 carbon atoms.

Each of $R_2$ and $R_4$ is independently of the other an alkyl group with maximally 18 carbon atoms, a monocyclic aralkyl group, the alkylene bridge of which, linked to the nitrogen atom at which $R_2$ and/or $R_4$ is substituted, has maximally 4 carbon atoms, further, an unsubstituted benzene radical or a benzene radical substituted with chlorine, fluorine, bromine or alkyl with maximally 12 carbon atoms.

$R_1$ and $R_2$ taken together, on the one hand, and/or $R_3$ and $R_4$ taken together on the other hand, can be joined to form a tetramethyleno, pentamethyleno, hexamethyleno, morpholino or N-methylpiperazino bridge.

The term "polyamine radical" as used in the instant specification and claims means the radical derived from an organic amine which has more than one and preferably two terminal —NH₂ group and may have from one to three —NH— members interrupting a straight, branched or cyclic chain of carbon atoms. Branched triamines are also comprised by this term.

Cyclic polyamine radicals are, for instance, the piperazine radical and the methyl piperazine radicals; mixed chain-and-cyclic polyamine radicals are those in which the acylatable amino groups are attached to, or incorporated (as —NH— or —N—) in a saturated aliphatic nucleus which consists of a straight and/or branched carbon atom sequence as well as saturated cyclic configurations of six carbon atoms per cycle. The chain-linked portions of the aliphatic nucleus are attached to the cyclic portions preferably in p- or o-position relative to each other.

A preferred configuration $A_1$ of the moiety A in the above Formula I corresponds to the formula

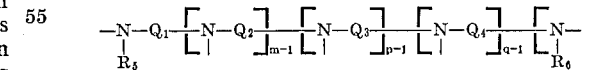

in which each of $m$, $p$ and $q$ is an integer ranging from 1 to 2, each of $Q_1$, $Q_2$, $Q_3$, $Q_4$ and $Q_5$ taken independently is an alkylene group the number of carbon atoms of which is at least two and such that the total number of carbon atoms in $A_1$ does not exceed 20; of course, in the whole molecule (Formula I), $n$ is 2 to 5 and the total number of nitrogen atoms is again at least 2 but not more than 5, all of the nitrogen atoms being acylatable and separated by at least two carbon atoms from one another;

$R_1$, $R_2$, $R_3$ and $R_4$ have the same meaning as stated in connection with Formula I above.

Each of $R_5$ and $R_6$ is either hydrogen, or an alkyl radical of maximally 18 carbon atoms, and $R_5$ and $R_6$ taken together can be either

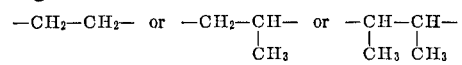

if $m=p=q=1$. In this case $Q_1$ has the same meaning as $R_5$ and $R_6$ taken together.

Another configuration, $A_2$, comprised by $A'$ in Formula II, which is to be found in compounds of good properties, is that of diamino radicals of the formula

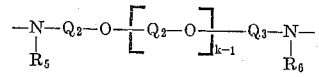

in which radical the oxygen and/or nitrogen atoms are separated by at least two carbon atoms from one another, $k$ being an integer ranging from 2 to 4; these are therefore, radicals of chain-linked diamines in which the chain of carbon atoms is interrupted by from one to four oxygen atoms.

$Q_1$, $Q_2$, $Q_3$, $R_5$ and $R_6$ have the same meanings as given above. Of course, in this case, $n$ in Formula I must be 2. Again, the total number of carbon atoms of $A_2$ must not exceed 20.

In a further class of functional fluids according to the invention, the moiety $A'$ of Formula II is represented by the radical $A_3$ of a cyclic or a mixed chain linked-and-cyclic diamine, which radical has the formula

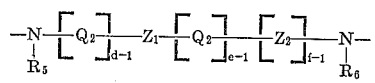

in which $Q_1$ and $Q_2$ have the meaning given above, $d$, $e$ and $f$ are each an integer ranging from 1 to 2, and each of $Z_1$ and $Z_2$, taken independently, are either cyclohexylene or methyl cyclohexylene.

Of course, in this case, $n$ in Formula I must be 2; $R_1$, $R_2$, $R_3$ and $R_4$ have the meanings given above, and the total number of carbon atoms of $A_3$ must not exceed 20.

The melamine derivatives produced according to the invention can contain mixtures of primary, secondary and tertiary amines. Because of their great heat stability, they can easily be obtained in pure form by distillation in a high vacuum. They can also be purified by extraction with a selective solvent such as acetic acid, by treatment with a bleaching earth such as Tonsil AC or an adsorptive earth such as Celite FC or with an ion exchanger such as Amberlite IR 120.

The melamine derivatives according to the invention are, at room temperature, either liquid, semi-solid fatty or waxy, non-crystalline or crystalline substances which are excellently thermostable and of low vapor-pressure. Depending upon their properties such as their viscosity-temperature relationship, their heat capacity, coefficient of heat transfer etc., the melamine derivatives are useful in many applications. The more important ones are as lubricants for parts if machines performing heavy duty at high temperatures, as safety lubricants for incorporation in bearings made of sintered metals or thermosetting resins, as waterproof sealing agents for porous surfaces such as wooden tiles and as heat transfer agents for heat exchangers operating at high temperatures.

Their advantage is the unusual combination of valuable properties such as high thermal stability, low volatility, high flash point, chemical inertness, low tendency for metallic corrosion and their ability to form lubricant films.

In particular, the very good stability to acid and alkali of the melamine derivatives according to the invention is remarkable. In a liquid condition they are distinguished by medium to high viscosity.

The melamines according to the invention can be used as lubricants in many ways. Properties desired for a particular purpose can also be obtained by producing suitable mixtures of these melamines alone or with other synthetic or mineral lubricants.

Such other lubricants are, for instance, sebacic acid 2-ethylhexyl ester, nonyl adipate, trimethylol propane tripelargonate, sebacid acid polypropylene glycol ester, dipentaerythritol hexapelargonate, 2,4-dibutylamino-6-didodecyl-s. triazine.

The melamines according to the invention are thus suitable for the lubrication of hard surfaces because in contact with these surfaces they form firmly adhesive films thereon, e.g. they are suitable for the lubrication of the surfaces of metals as well as alloys thereof, the surfaces of silicates such as, e.g. of glasses as well as of other materials requiring lubrication such as, e.g. rubber seals.

The N,N',N''-substituted melamines according to the invention can be used alone; however they can also contain additives. Thus, in order to make use of their favourable stability to heat at over 150° C, they are advantageously mixed with antioxidants in order to hinder the autoxidation which occurs above this temperature. The content of antioxidants for this purpose is about 0.01–5% of the melamines.

Homocyclic or heterocyclic aromatic amines, hydroxy-substituted aromates, aminohydroxyaryl compounds as well as certain heterocyclic compounds are employed as antioxidants.

Of the amines, in general the secondary monoamines, in particular the diarylamines having homo- and heterocyclic aromatic radicals as well as the aromatic diamines the amine substituents of which, which are preferably secondary, are in the o- or advantageously the p-positions, are particularly valuable.

Examples of antioxidants from the class of homo- and hetero-cyclic aromatic diarylamines are diphenylamines, phenylnapthylamines, phenylacenaphthenylamines; 4,4'-dinaphthylamino-diphenyl; thiazolyl-(2)-naphthylamines; examples of aromatic diamines are N,N'-diphenyl-p-phenylenediamine, N,N'-dioctyl-p-phenylenediamine, N,N'-dicyclohexyl-p-phenylenediamine, N-sec. butyl-N'-phenylenediamine, N,N'-bis-(γ-aminopropyl)-p-phenylenediamine.

Of the antioxidants from the class of hydroxyl-substituded aromates which can be employed in particular at not too high working temperatures (i.e. below 200–300° C. depending on type and substratum), those having a sterically hindered hydroxyl group as well as the derivatives of dihydroxyaryl compounds the hydroxyl groups of which are in the o- or p-position to each other are suitable. Particularly valuable examples of compounds which can be used are the monophenol derivatives such as 2,4-dimethyl-6-tert. butyl phenol, 2,6-di-tert. butyl-4-ethylphenol, 2,6-bis-(1'-methylcyclohexyl)-4-methylphenol, 2,6-di-tert. butyl-4-dimethylamino-methylphenol, 2,2'-methylene-bis-(4-methyl-6-tert. butylphenol), 2,2'-thio-bis-(4-methyl-6-tert. butylphenol), 4,4'-dihydroxy-2,2'-dimethyl-5,5'-di-tert. butyl-diphenyl sulphide and diphenyl disulphide, 2,6-bis-(2'-hydroxy-3'-tert. butyl-5'-methylbenzyl)-4-methylphenol; derivatives of polynuclear phenols such as 2-tert. butyl-1-hydroxynaphthalene, 4,6-di-tert. butyl-5-hydroxyindane, 5-hydroxyacenaphthene; polyvalent phenols and their deratives: butylpyrocatechine, octylgallate, hydroquinone, butylhydroxy anisole, hydroquinone monobenzylether.

Of the aminohydroxyaryl compounds, those derivatives having the amino and hydroxyl groups in p-position to each other are particularly suitable as antioxidants. Examples are: p-hydroxydiphenylamine, p-hydroxyoctylaniline, p-hydroxy-N,γ-aminopropylaniline.

Of the heterocyclic antioxidants, the cyclic imides are the best known; in addition however, heterocyclic compounds containing no nitrogen can be employed provided they are not within the class of heterocyclic amines. Examples are: phenothiazine, iminodibenzyl, 5-ethyl-10,10-diphenyl-phenosilazine, 6-methoxy- or 6-ethoxy- or 6-ethylamino-2,2,4-trimethyl-1,2-dihydroxyquinoline or the telomers thereof, 3-hydroxy-7,8-benzo-1,2,3,4-tetrahyroquinoline or tocopherol.

In addition, the N,N',N''-substituted melamines according to the invention can contain high pressure additives such as phosphites, phosphates, sulfonates; anticorrosives such as sarcosines or benztriazoles; agents lowering the solidification point, and, possibly, also anti-foaming agents based on silicone.

Also the invention includes lubricating greases produced from the melamine derivatives according to the invention by the addition of the usual thickeners. Examples of such thickeners are metal soaps, bentonite, phthalocyanines, violanthrones, indanthrenes, flavanthrenes, pyranthrones, isatines, indigo.

Those compounds falling under Formulas I and II in which $R_1$, or both $R_1$ and $R_3$ are hydrogen and $n$ is 2, and which having a melting point above 60° C. and preferably between 70° C. and 120° C. are also useful as wood sealing agents.

The following examples illustrate the production and usability of the melamine derivatives having more than one 1,3,5-triazine ring according to the invention. Where not otherwise expressly stated, parts are given as parts by weight. The temperature, where not otherwise indicated, is given in degrees centigrade. The relationship of parts by weight to parts by volume is as that of grammes to millilitres.

*Example 1.—1,6-bis-(2'-diethylamino-4'-dibutylamino-s-triazinyl-(6')-amino)-hexane*

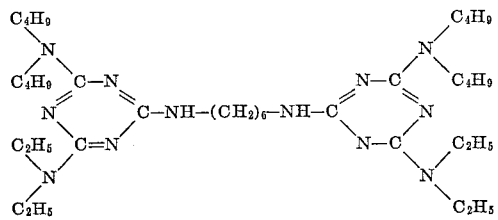

A mixture consisting of 160 parts of 2-diethylamino-4-dibutylamino-6-chloro-s-triazine (B.P.$_{0.02}$ 138°; $n^{25}_D$ 1.5147) 29.8 parts of 1,6-diaminohexane and 26 parts of pulverised sodium hydroxide is stirred for 4 hours at 120°; it is then diluted with 170 parts of xylene and refluxed for another 4 hours. Inorganic components are then filtered off, the filtrate is washed with water, the xylene is distilled off and the residue is heated for another hour at 240° under 0.5 mm. pressure. 161 parts of 1,6-bis-(2'-diethylamino - 4'-dibutylamino-s-triazinyl-(6')-amino)-hexane are obtained as residue. It is a pale yellow mass the refraction index of which is $n_D^{25}$ 1.5303. The yield is 93.8% of the theoretical.

*Analysis.*—$C_{26}H_{70}N_{12}$, M.W. 670, calculated, percent, C, 64.35; H, 10.43; N, 25.02. Found, percent, C, 64.59; H, 10.68; N, 24.99.

The product is a heat-stable, viscous and fatty mass. The dependency of the viscosity on temperature is very favorable for use as lubricant.

*Example 2.—N,N'-bis-(2'-diethylamino-4'-dibutylamino-s-triazinyl-(6')-1,8-p-diaminomenthane*

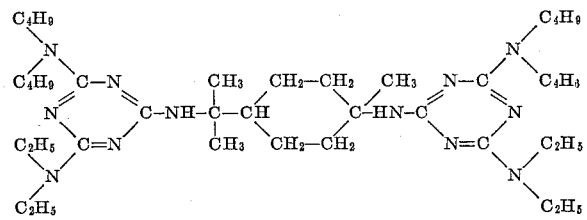

A mixture consisting of 108 parts of N,N'-bis-(2'-diethylamino - 4' - chloro - s - triazinyl - (6') - 1,8 - p - diamino menthane, obtained by reacting 0.5 mole of cyanuric chloride with 1 mole of diethylamine and then with 1 mole of 1,8-p-diaminomenthane, 129 parts of dibutylamine and 10 parts of pulverized sodium hydroxide is stirred for 3 hours at 130°, then diluted with 100 parts of xylene and refluxed overnight. The solution is clarified by filtration, washed, the xylene is distilled off and the residue is heated for another hour at 240° under 0.01 mm. pressure. As residue, 124 parts of a tough hard mass which melts at about 40° are obtained. The yield is 86% of the theoretical.

*Analysis.*—$C_{40}H_{76}N_{12}$; M.W.=724, Calculated, percent, C, 66.37; H, 10.50; N, 23.20. Found, percent, C, 66.52; H, 10.53; N, 23.37.

At room temperature, the product is hard and wax-like

The N,N' - bis - (2' - diethylamino - 4' - chloro - s - triazinyl-(6')-1,8-p-diaminomenthane used in this example is produced as follows:

222 parts of cyanuric chloride are dissolved in 700 parts of chlorobenzene and the solution is cooled to —13°. 103.3 parts of 1,8-diaminomenthane and 70 parts of water are added dropwise separately within 1 hour. Then 48 parts of sodium hydroxide dissolved in 192 parts of water are added dropwise at —5° to —10° within 1½ hours. The reaction mixture is neutral after 2 hours. 90 parts of diethylamine and 90 parts of water are then added dropwise at 20–25°, followed by 48 parts of sodium hydroxide in 192 parts of water at 20–25° within 50 minutes. The mixture is heated to 40°. After half an hour it is neutral. After working up in the usual way and eliminating all solvents, 286.5 parts of the desired intermediate product are obtained.

The crude product melts at 133–139° and is already pure for analytical purposes. The yield is 88.6% of the theoretical.

*Analysis.*—$C_{24}H_{40}N_{10}Cl_2$; M.W. 539, Calculated, percent, C, 53.50; H, 7.42; N, 25.90; Cl, 13.20. Found, percent, C, 53.75; H, 7.31; N, 25.56; Cl, 13.38.

*Example 3.—N,N'-bis-(2',4'-bis-dibutylamino-s-triazinyl-(6')-piperazine*

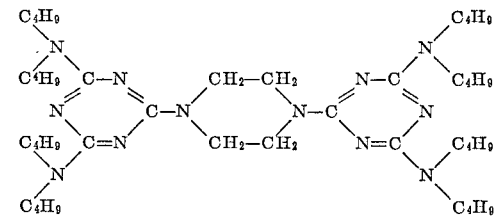

A mixture consisting of 147.6 parts of 2,4-bis-dibutylamino-6-chloro-s-triazine ($n_D^{25}$ 1.5071), 17.30 parts of piperazine and 20 parts of pulverised sodium hydroxide is stirred for 5 hours at 120°, then diluted with 200 parts of xylene, and stirred for another 11 hours at 150°. Inorganic components are then filtered off and the xylene solution is worked up as described in the previous examples. 144 parts of a yellowish, wax-like mass which melts at 92–93° are obtained. The yield is 96.0% of the theoretical.

*Analysis.*—$C_{42}H_{80}N_{12}$; M.W=752, calculated, percent, C, 67.00; H, 10.61; N, 22.35. Found, percent, C, 67.02; H, 10.43; N, 22.22.

If 1,2- or 1,3-hexahydro diazines or derivatives thereof alkylated at a carbon atom are used similarly to the way described for piperazine and these are condensed with nitrogen-substituted 2,4-diamino - 6 - chloro-s-triazines to form the corresponding dimelamines, then compounds with similar properties are also obtained.

The product is very stable to heat and is suitable as lubricant where there is exposure to high temperatures.

*Example 4.—1,2-bis-(2',4'-bis-dibutylamino-s-triazinyl-(6')-amino)-2-methylethane*

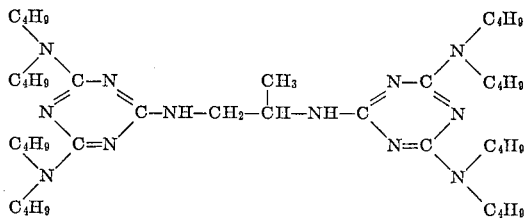

A mixture consisting of 14.8 parts of 1,2-propylenediamine, 147.8 parts of 2,4-bis-dibutylamino-6-chloro-s-triazine and 20 parts of pulverised sodium hydroxide is stirred for 4 hours at 120°, then diluted with 250 parts of xylene and refluxed for another 10 hours. The product is worked up as described in Example 1 and finally heated at 230° under 0.02 mm. pressure for 25 minutes. 138 parts of a wax-like mass which melts at 55° are obtained. The yield is 93.3% of the theoretical.

*Analysis.*—$C_{41}H_{80}N_{12}$; M.W. 740, calculated, percent, C, 66.40; H, 10.82; N, 22.68; Cl, 0.0. Found, percent, C, 65.86; H, 10.72; N, 22.46; Cl, 0.7.

On heating the wax-like mass obtained at 380°, neither acid nor alkaline decomposition products are formed. It is useful as heat transfer agent for heat exchangers operating at 100–200°.

*Example 5.—N,N-bis-[2',4'-bis-dibutylamino-s-triazinyl-(6')]-1,2-di-(ω-aminopropoxy)-propane*

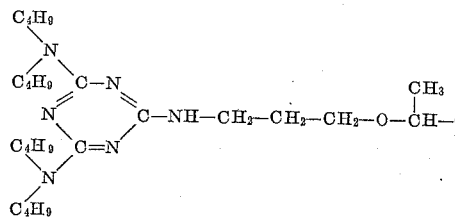

A mixture consisting of 126 parts of 2,4-bis-dibutylamino-6-chloro-s-triazine, 32.3 parts of bis-(γ-aminopropyl)-1,2-propylene glycol diether and 16.8 parts of pulverized sodium hydroxide is heated for 4 hours at 130°, then diluted with 170 parts of xylene and stirred under reflux for another 6 hours. After removal of all inorganic components, the reaction product is heated for 35 minutes at 240° under 0.09 mm. pressure. 135.5 parts of N,N'-bis-[2',4'-bis-dibutylamino-s-triazinyl - (6')] - 1,2 - di-(ω-aminopropoxy)-propane are obtained. Refraction index: $n_D^{25}$ 1.5095, yield: 93.2% of the theoretical.

*Analysis.*—$C_{47}H_{92}N_{12}O_2$; M.W. 856, calculated, percent, C, 65.95; H, 10.73; N, 19.65. Found, percent, C, 66.12; H, 10.76; N, 19.52.

Similar low melting bismelamines produced other diamines having branched chains which were synthesized, for example, from isosebacic acid and branched chain eicosane dicarboxylic acid. The product has a very good ASTM slope of 0.675 and solidifies only at about −24°.

*Example 6.—1,4-bis-[2',4'-bis-dibutylamino-s-triazinyl-(6')-aminomethyl]-cyclohexane*

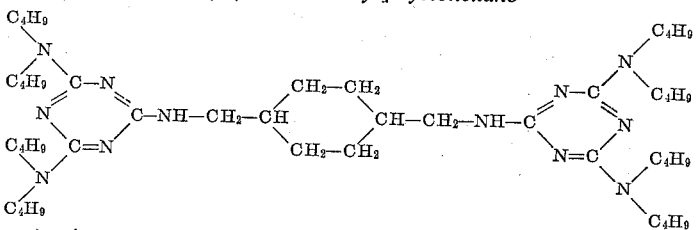

A mixture consisting of 29 parts of p-bis-aminomethyl-cyclohexane, 147 parts of 2,4-bis-dibutylamino-6-chloro-s-triazine and 20 parts of pulverised sodium hydroxide is stirred for 5 hours at 120°, diluted with 200 parts of xylene and then stirred under reflux for another 10 hours. After elimination of the inorganic components the end product is heated for half an hour at 240° under 0.02 mm. pressure. As residue, 151 parts of 1,4-bis-[2',4'-bis-dibutylamino-s-triazinyl-(6')-aminomethyl] - cyclohexane are obtained. Refraction index: $n_D^{25}$ 1.5238, yield: 93.5% of the theoretical.

*Analysis.*—$C_{46}H_{88}N_{12}$; M.W. 808.5, calculated, percent, C, 68.40; H, 10.90; N, 20.80. Found, percent, C, 68.38; H, 10.97; N, 20.54.

The product is a viscous, clear mass which is stable to heat.

*Example 7.—1,2-bis-[2',4'-bis-dibutylamino-s-triazinyl-(6')-amino]-cyclohexane*

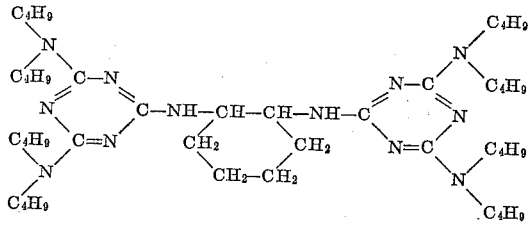

A mixture consisting of 147.6 parts of 2,4-bis-dibutylamino-6-chloro-s-triazine, 22.4 parts of trans-o-diamino-cyclohexane and 20 parts of pulverised sodium hydroxide is stirred for 4 hours at 120°, 150 parts of xylene are then added and the whole is refluxed for another 12 hours with stirring. The product obtained is then heated for 1 hour at 240° under 0.07 mm. pressure. 137 parts of a very tough mass are obtained, which corresponds to a yield of 87.9% of the theoretical.

*Analysis.*—$C_{44}H_{84}N_{12}$; M.W. 780. Calculated, percent, C, 67.60; H, 10.77; N, 21.55. Found, percent, C, 67.43; H, 10.79; N, 21.66.

The product is a viscous mass which is stable to heat.

*Example 8.—1,6-bis-(2'-dibutylamino-4'-octadecylamino-s-triazinyl-(6')-amino)-hexane*

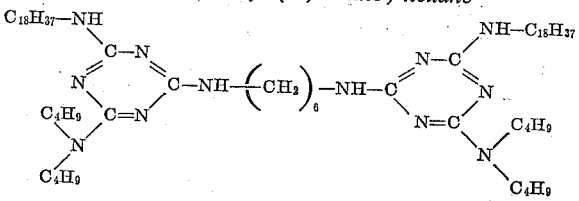

A mixture consisting of 127.5 parts of 2-dibutylamino-4-octadecylamino-6-chloro-s-triazine (M.P. 83°), 14.6 parts of 1,6-diaminohexane and 12 parts of pulverised sodium hydroxide are stirred for 6 hours at 120°, 220 parts of xylene are then added and the whole is stirred under reflux for another 6 hours. On working up as described in Example 7, 125 parts of a product which melts at 72–73° are obtained which corresponds to a yield of 94.2% of the theoretical.

*Analysis.*—$C_{64}H_{126}N_{12}$; M.W. 1062. Calculated, percent, C, 72.30; H, 11.85; N, 15.85. Found, percent, C, 72.07; H, 11.91; N, 16.11.

The product is wax-like at room temperature and very stable to heat.

*Example 9.—1,6-bis-[2'-diethylamino-4'-(N-methyl-N-dodecylamino)-s-triazinyl-(6')-amino]-hexane*

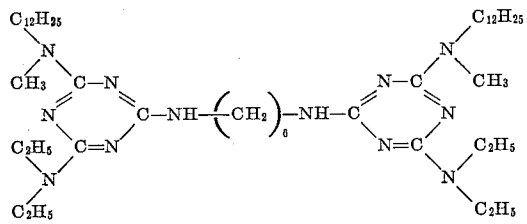

A mixture consisting of 158 parts of 2-diethylamino-4-(N-methyl - N-dodecylamino) - 6-chloro-s-triazine, 21 parts of 1,6-diaminohexane and 17.6 parts of pulverised sodium hydroxide is stirred for 4 hours at 120°, diluted with 120 parts of chlorobenzene and then refluxed for 9 hours. On working up, 137 parts of a product of refraction index $n_D^{25}$ 1.5172 are obtained. The yield is 93% of the theoretical.

*Analysis.*—$C_{46}H_{90}N_{12}$; M.W. 810. Calculated, percent, C, 68.00; H, 11.12; N, 20.79. Found, percent, C, 68.27; H, 11.12; N, 20.65.

The product is only very slightly volatile. After heating to 380° for 6 hours, the viscosity measured at 98.9°, only alters about 2.34%.

*Example 10.—1,6-bis-(2-diethylamino-4-isopropylamino-s-triazinyl-(6')-amino)-hexane*

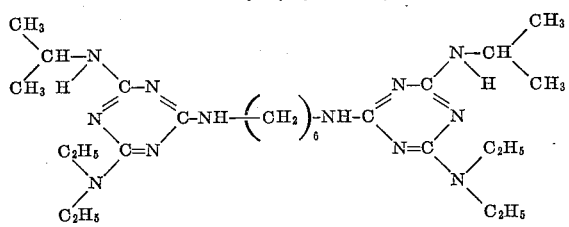

A mixture consisting of 146.2 parts of 2-diethylamino-4-isopropylamino-6-chloro-s-triazine, 35 parts of 1,6-diaminohexane and 31.2 parts of pulverized sodium hydroxide is stirred for 4 hours at 120°, then diluted with 160 parts of ethyl benzene and stirred under reflux for another 10 hours. On working up as described in Example 1, 152 parts of a product are obtained. M.P. 52–54°, yield: 95.6% of the theoretical.

*Analysis.*—$C_{26}H_{50}N_{12}$; M.W. 530. Calculated, percent, C, 58.82; H, 9.43; N, 31.70. Found, percent, C. 58.70; H, 951; N, 31.50.

The product is very stable to heat and, at room temperature, is wax-like.

*Example 11.—1,6-bis-(2'-hexamethyleneimino-4'-dibutylamino-s-triazinyl-(6')-amino)-hexane*

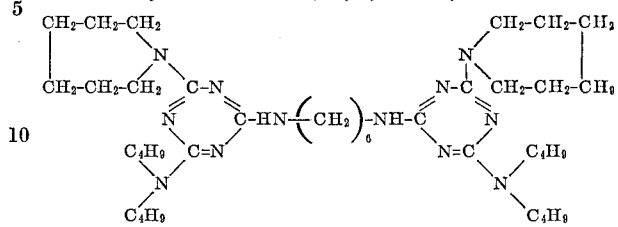

A mixture consisting of 60 parts of 1,6-bis-(2'-chloro-4'-dibutylamino-s-triazinyl-(6)-amino)-hexane, 23.9 parts of hexamethyleneimine, 9.2 parts of pulverized sodium hydroxide and 200 parts of xylene is stirred for 8 hours at 140°. On working up, 63.5 parts of a product of refraction index $n_D^{25}$ 1.5444 are obtained. The yield is 88.1% of the theoretical.

*Analysis.*—$C_{40}H_{74}N_{12}$; M.W. 722, Calculated, percent, C, 66.50; H, 10.23; N, 23.24. Found, percent, C, 66.69; H, 10.41; N, 23.38.

The 1,6-bis-(2'-hexamethyleneimino-4'-dibutylamino-s-triazinyl-(6')-amino)-hexane obtained is a yellow, greasy mass.

*Example 12.—N,N',N''-tri-[2,4-bis-dibutylamino-s-(6)]-dipropylenetriamine*

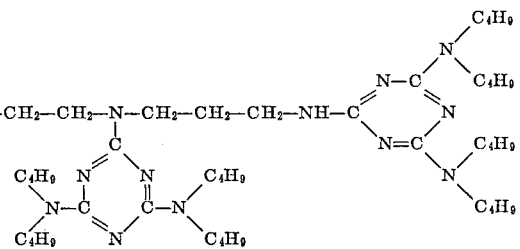

A mixture consisting of 19.7 parts of dipropylenetriamine, 166.5 parts of 2,4-bis-dibutylamino-6-chloro-s-triazine and 22 parts of pulverised sodium hydroxide is stirred for 2½ hours at 120°, diluted with 200 parts of xylene and then stirred under reflux for another 14 hours. On working up as described in Example 1, 146 parts of residue of refraction index $n_D^{25}$ 1.5252 were obtained. The yield is 86.2% of the theoretical.

*Analysis.*—$C_{63}H_{122}N_{18}$; M.W. 1130, Calculated, percent, C, 67.00; H, 10.78; N, 22.32. Found, percent, C, 66.73; H, 10.79; N, 22.20.

The N,N',N''-tri-[2,4-bis-dibutylamino-s-triazinyl-(6)] dipropylenetriamine obtained is a viscous mass which, in spite of the high molecular weight, only becomes solid at —6°.

*Example 13.—N,N',N'',N'''-tetra-[2,4-dibutylamino-s-triazinyl-(6)]-triethylenetetramine*

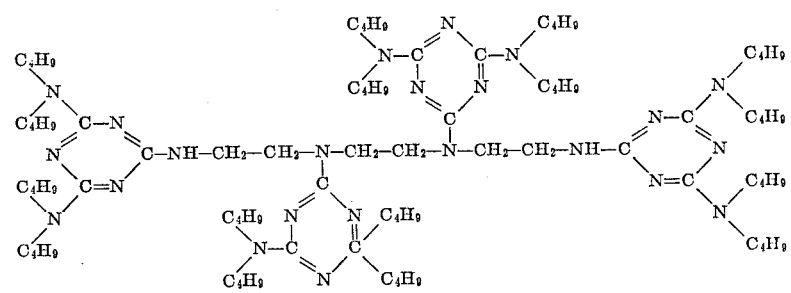

A mixture consisting of 21.9 parts of triethylenetetramine, 222 parts of 2,4-bis-dibutylamino-6-chloro-s-triazine and 33.6 parts of pulverised sodium hydroxide is stirred for 4 hours at 120°, diluted with 250 parts of xylene and then refluxed for another 10 hours. After elimination of all inorganic components, 221 parts of N,N',N'',N'''-tetra-[2,4 - bis-dibutylamino-s-triazinyl-(6)]-triethylenetetramine are obtained. It melts between 75 and 80° and is a wax-like stable mass having no smell. The yield is 99.1% of the theoretical.

*Analysis.*—$C_{82}H_{158}N_{24}$; M.W. 1478, Calculated, percent, C, 66.67; H, 10.69; N, 22.88; Cl. 0.0. Found, percent, C, 66.87; H, 10.61; N, 22.59; Cl. 0.1.

*Example 14.—1,10-bis-(2',4'-octylamino-s-triazinyl-(6')-amino)-decane*

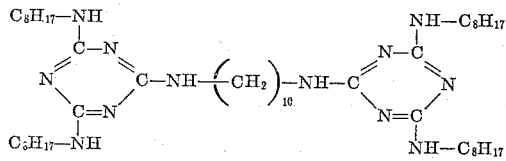

A mixture consisting of 73.9 parts of 2,4-bis-octylamino-6-chloro-s-triazine, 17.2 parts of 1,10-diaminodecane, 10 parts of pulverised sodium hydroxide and 150 parts of xylene is refluxed overnight. After elimination of all inorganic components, the end product is heated at 240° under 0.1 mm. pressure. 78 parts of 1,10-bis-(2',4'-octylamino-s-triazinyl-(6')-amino)-decane are obtained. Refraction index $n_D^{25}$ 1.5218; yield: 93.1% of the theoretical.

*Analysis.*—$C_{48}H_{94}N_{12}$; M.W. 838, Calculated, percent, C, 68.80; H, 11.22; N, 20.06. Found, percent, C, 68.73; H, 11.36; N, 19.81.

At room temperature the product is very viscous, and it is very stable to heat at higher temperatures.

*Example 15.—N,N',N''-tri-(2-diethylamino-4-dibutylamino-s-triazinyl-(6))-dihexamethylenetriamine*

A mixture consisting of 65.6 parts of dihexamethylenetriamine, 282 parts of 2-diethylamino-4-dibutylamino-6-chloro-s-triazine and 46 parts of pulverised sodium hydroxide is stirred for 2½ hours at 120°, then diluted with 320 parts of isopropylbenzene and refluxed for 8 hours. After removal of all inorganic components, the product is heated for 30 minutes at 230° under 0.1 mm. pressure. 282.5 parts of a viscous, fat-like mass are obtained which corresponds to a yield of 89.5% of the theoretical.

*Analysis.*—$C_{57}H_{110}N_{18}$; M.W. 1046, calculated, percent, C, 65.46; H, 10.52; N, 24.10. Found, percent, C, 65.28; H, 10.54; N, 24.23.

*Example 16.—N,N',N''-tri-(2,4-bis-dibutylamino-s-triazinyl-(6))-diethylene-triamine*

A mixture consisting of 20.6 parts of distilled diethylenetriamine, 216 parts of 2,4-bis-dibutylamino-6-chloro-s-triazine, 33.6 parts of pulverised sodium hydroxide and 150 parts of xylene is refluxed with stirring for 12 hours. On working up, 200.5 parts of the trimelamine were obtained. B.P.$_{0.001}$>240°; M.P. 89–92°; yield 91.1% of the theoretical.

*Analysis.*—$C_{61}H_{118}N_{18}$; M.W. 1102, calculated percent, C, 66.50; H, 10.55; N, 22.89. Found, percent, C, 66.35; H, 10.91; N, 22.74.

The product is wax-like, stable to heat and has no smell.

*Example 17.—N,N',N'',N''',N''''-penta-(2-4-bis-dibutylamino-s-triazinyl-(6))-tetra-ethylenepentamine*

A mixture consisting of 19 parts of distilled tetraethylenepentamine, 185 parts of 2,4-bis dibutylamino-6-chloro-s-triazine and 28 parts of pulverised sodium hydroxide is heated at 120°, diluted with 200 parts of ethylbenzene and then stirred under reflux for 16 hours. The reaction mixture is worked up warm and produces 162 parts of pentamelamine which becomes soft at room temperature but only forms a clear melt at 80°. The yield is 87.7% of the theoretical.

*Analysis.*—$C_{103}H_{198}N_{30}$; M.W. 1854, calculated, percent, C, 66.14; H, 10.61; N, 22.89; Cl, 0. Found, percent, C, 66.51; H, 10.67; N, 22.63; Cl, 0.2.

The product has properties similar to that described in Example 16.

*Example 18.—1,2,3-tri-(2'-diethylamino-4'-dibutylamino-s-triazinyl-(6')-amino)-propane*

A mixture consisting of 8.9 parts of 1,2,3,-triaminopropane, 95 parts of 2-diethylamino-4-dibutylamino-6-chloro-s-triazine and 15 parts of pulverised sodium hydroxide is heated at 120°. After 3 hours it is diluted with 120 parts of xylene and then stirred under reflux for another 10 hours. Working up produces 77.1 parts of a highly viscous mass and the yield is 83.7% of the theoretical.

Analysis.—$C_{48}H_{92}N_{18}$; M.W. 920.0, calculated, percent, C, 65.60; H, 10.0; N, 27.37. Found, percent, C, 65.85; H, 10.02; N, 27.02.

The product is wax-like.

*Example 19.—1 - (2' - diethylamino - 4' - dibutylamino-s - triazinyl - (6') - amino)6 - [2'',4'' - bis - (diethylamino) - s - triazinyl - (6'') - amino] - hexane*

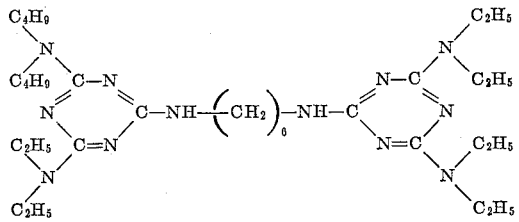

A mixture consisting of 125.4 parts of 2-diethylamino-4-dibutylamino-6-chloro-s-triazine, 103 parts of 2,4-bis-diethylamino-6-chloro-s-triazine, 46.4 parts of 1,6-diaminohexane and 38 parts of pulverised sodium hydroxide is stirred for 4 hours at 120°, diluted with 270 parts of xylene and then stirred under reflux for another 8 hours. After elimination of all inorganic components and xylene, the product is heated for another 45 minutes under 0.2 mm. pressure.

224.2 parts of 1-(2'-diethylamino-4'-dibutylamino-s-triazinyl - (6') - amino)-6-[2'',4''-bis(dibutylamino)-s-triazinyl-6'')-amino]-hexane are obtained as residue. It is a pale yellow mass which solidifies at 9°. The yield is 91.2% of the theoretical.

Analysis.—$C_{32}H_{62}N_{12}$: M.W. 614, calculated, percent, C, 62.65; H, 10.01; N, 27.35. Found, percent, C, 62.79; H, 10.10; N, 26.93.

The product is stable to heat and there is no appreciable loss of weight on heating for 6 hours at 380°.

*Example 20.—1,6-bis[2'-dimethylamino-4'-(N-phenyl-N-methylamino)-s-triazinyl-(6')-amino]-hexane*

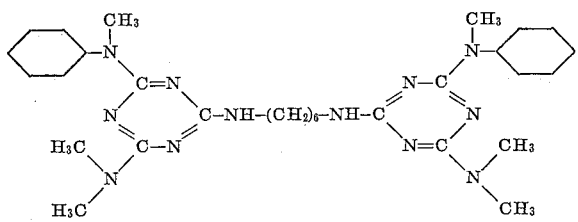

A mixture consisting of 39.6 parts of 2-dimethylamino-4-(N-phenyl-N-methylamino)-6-chloro - s - triazine, 8.7 parts of 1,6-diaminohexane, 7.2 parts of pulverized sodium hydroxide and 90 parts of xylene is stirred under reflux overnight. After elimination of all organic components, the end product is heated for 1 hour under vacuum of 0.1 mm. Hg at 240°. 42.7 parts of 1,6-bis-[2'-dimethylamino-4'-(N-phenyl-N-methylamino)-s - trianzinyl - (6') amino]-hexane are obtained. M.P. 57–60°. The yield is 98.2% of the theoretical. Analysis of the crude product, $C_{30}H_{42}N_{12}$; M.W. 390, shows:

Calculated, percent, C, 63.25; H, 7.35; N, 29.50. Found, percent, C, 63.11; H, 7.63; N, 29.30.

The product is heat stable.

Analogous bis-triazine derivatives are obtained if in the above example, the 2-dimethylamino-4-(N-phenyl-N-methylamino)-6-chloro-s·triazine is replaced by equivalent parts of 2-diethylamino-4-(N-chlorophenyl-N-ethylamino)-6-chloro-s·triazine or 2-dibutylamino-4-(N-xylyl- or N-toluyl- or N-dodecyl- or N-benzyl- amino, or -N-methylamino or -N-ethylamino)-6-chloro-s·triazine.

*Example 21.—1,2 - bis - (2'-diethylamino-4'-isopropylamino-s·triazinyl-(6')-amino)-ethane*

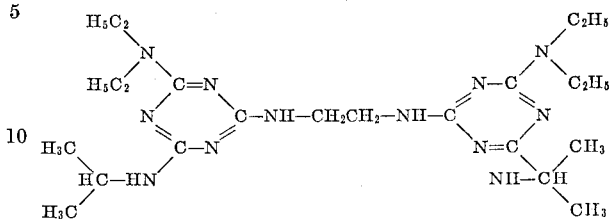

A mixture consisting of 124.5 parts of 2-diethylamino-4-isopropylamino-6-chloro-s·triazine, 15.1 parts of 1,2-diaminoethane, 36.2 parts of pulverised potassium hydroxide and 180 parts of ethyl benzene is stirred for 10 hours at 120° and then for 2 hours at 140°. After elimination of all organic components, the end product is heated for 1 hour at 230° and 0.01 mm. Hg. 114 parts are obtained which corresponds to a yield of 96.5%. This product melts at 69–72° and has the following analysis:

Analysis.—$C_{22}H_{42}N_{12}$, M.W. 452, calculated, percent, C, 55.75; H, 8.94; N, 35.40. Found, percent, C, 55.76; H, 8.93; N, 33.16.

The product has no smell and is heat stable.

Analogous bis-s-triazine derivatives are obtained if in the above example, 1,2-diaminoethane is replaced by equivalent parts of 1,4-diaminobutene-2 or 1,2-diaminopropane or 1,20-diaminoeicosane.

*Example 22.—1,2-bis - (2',4'-bis-ethylamino-s·triazinyl (6')-amino)-ethane*

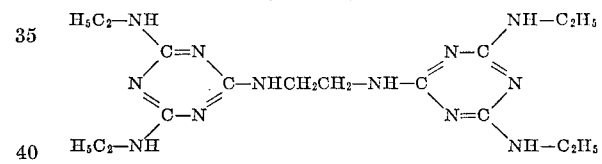

A mixture consisting of 121 parts of 2,4-bis-ethylamino-6-chloro-s·triazine, 18.1 parts of 1,2-diaminoethane, 18.4 parts of pulverised sodium hydroxide and 300 parts of xylene is refluxed overnight while stirring. After elimination of all inorganic components, the end product is heated for 1 hour at 230° under 0.01 mm. Hg. 107 parts of 1,2 - bis-(2',4'-bis-ethylamino-s-triazinyl-(6')-amino) ethane—a yield of 91.2%—are obtained. The product so isolated is pure enough for analysis as can be seen from the elementary analysis M.P. 88–90°.

Analysis.—$C_{16}H_{30}N_{12}$, M.W. 390, Calculated, percent, C, 49.35; H, 7.70; N, 43.00. Found, percent, C, 49.24; H, 7.80; N, 42.67.

Analogous bis-triazine derivatives are obtained if in the above example instead of 2,4-bis-ethylamino-6-chloro-s.triazine, equivalent parts of 2,4-bis-allylamino-6-chloro-s.triazine or 2,4-bis-octadecenylamino-6-chloro-s. triazine are used. Also the 1,2-diaminoethane can be replaced by equivalent amounts of 1,2-diaminopropane.

*Example 23.—1,6-bis-(2',4'-bis-dimethylamino-s. triazinyl-(6')-amino)-hexane*

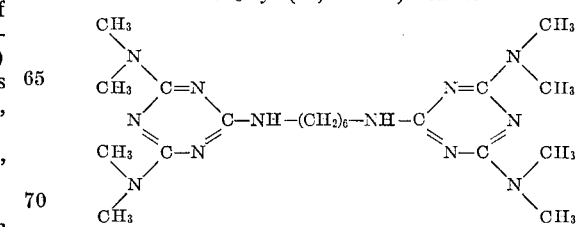

A mixture consisting of 80.6 parts of 2,4-bis-dimethylamino-6-chloro-s.triazine, 23.2 parts of 1,6-diaminohexane, 19.2 parts of pulverised sodium hydroxide and 120 parts of xylene is stirred under reflux overnight. All inorganic components are eliminated by dilution with chloroform. The end product is heated for 1 hour at 230° under 0.01 mm. Hg. A residue of 83.7 parts of 1,6-bis-(2',4' - bis-dimethylamino-s.triazinyl-(6')-amino)-hexane is obtained. M.P. 165–166°. Yield 93.7%. The product is already sufficiently pure for analysis as can be seen from the elementary analysis:

*Analysis.*—$C_{20}H_{38}N_{12}$, M.W. 446, calculated, percent, C, 53.70; H, 8.52; N, 37.67. Found, percent, C, 53.67; H, 8.59; N, 37.54.

An analogous bis-s.triazine derivative is obtained if in the above example the 2,4-bis-dimethylamino-6-chloro-s.triazine is replaced by equivalent parts of 2-di-isobutenylamino - 4 - dimethylamino - 6-chloro-s.triazine. Also, the 1,6-diaminohexane can be replaced by equivalent parts of 1,18-diaminooctadecane.

*Example 24.—1,2-bis-(2',4'-bis-dimethylamino-s. triazinyl-(6')-amino)-ethane*

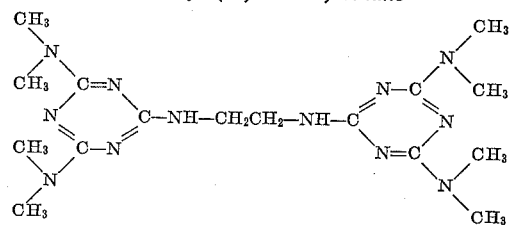

A mixture consisting of 50.8 parts of 2,4-bis-dimethylamino-6-chloro-s.triazine, 7.6 parts of 1,2-diaminoethane, 12 parts of pulverised sodium hydroxide and 150 parts of xylene are stirred under reflux overnight, then diluted with chloroform and all inorganic components are eliminated. The end product is heated for 1 hour at 230° under 0.01 mm. Hg. 45.2 parts of 1,2-bis-(2',4'-bis-dimethylamino-s.triazinyl-(6')-amino)-ethane are obtained as distillation residue. Yield 92.3%. M.P. (recrystallised from ethanol) 210–211°.

*Analysis.*—$C_{16}H_{30}N_{12}$, M.W. 390, calculated, percent, C, 49.25; H, 7.69; N, 43.15. Found, percent, C, 49.41; H, 7.87; N, 43.00.

Analogous bis-s.triazine derivatives are obtained if in the above example the 2,4-bis-dimethylamino-6-chloro-s.triazine is replaced by equivalent parts of 2-diallylamino-4-dimethylamino-6-chloro-s.triazine or 2-dimethylamino-4-dioctylamino-6-chloro-s.triazine. Also the 1,2-diaminoethane can be replaced by equivalent amounts of 1,2-diaminopropane.

When great quantities are used, in some cases the condensation between monochlorotriazines and amines is rather exothermic. In Example 28 of the following Table I for example, 1007.5 parts of 2,4-bis-ethylamino-6-chloro-s.triazine were stirred with 296 parts of 1,6-diaminohexane and 250 parts of sodium hydroxide. Due to the exothermic reaction, in spite of exterior cooling with ice water, the reaction temperature rose within a short time to 172°. Thus the condensation was completed in a relatively short time.

Condensation with exclusion of oxygen leads to considerably lighter coloured end products.

TABLE I

| No. | X | Y | Z | Percent | MW | Solidification point |
|---|---|---|---|---|---|---|
| 25 | $N(C_2H_5)_2$ | $N(C_2H_5)_2$ | $HN(CH_2)_6NH$ | 90.0 | 558 | Viscous |
| 26 | $HNC_2H_5$ | $HNC_2H_5$ | $HN(CH_2)_6NH$ | 95.3 | 446 | 90 |
| 27 | $N(C_4H_9)_2$ | $N(C_4H_9)_2$ | $HN(CH_2)_6NH$ | 85.0 | 782 | −4 |
| 28 | $N(C_4H_9)_2$ | $N(CH_3)_2$ | $HN(CH_2)_6NH$ | 88.9 | 614 | 15 |
| 29 | $N(C_4H_9)_2$ | $N(C_4H_9)_2$ | $HN(CH_2)_8NH$ | 94.2 | 810 | −13 |
| 30 | $N(C_2H_5)_2$ | $N(C_2H_5)_2$ | $HN(CH_2)_{10}NH$ | 88.2 | 614 | 14 |
| 31 | $N(C_4H_9)_2$ | $N(C_4H_9)_2$ | $HNCH_2CH_2OCH_2CH_2$ $\mid$ $HNCH_2CH_2O$ | 89.3 | 814 | −11 |
| 32 | $N(C_4H_9)_2$ | $N(C_4H_9)_2$ | $HN$-⟨H⟩-$CH_2$-⟨H⟩-$NH$ | 98.2 | 876 | 25 |
| 33 | $N(C_4H_9)_2$ | $N(C_4H_9)_2$ | $N$—$CH_2$—$CH_2$—$N$ $\mid$ $\mid$ $C_4H_9$ $C_4H_9$ | 98.1 | 838 | 76–78 |
| 34 | $N(C_4H_9)_2$ | $N(C_{18}H_{37})_2$ | $HN(CH_2)_6NH$ | 94.7 | 1,566 | 2 |
| 35 | $N(C_4H_9)_2$ | $N(C_2H_5)_2$ | $HNCH_2CH_2NH$ | 87.6 | 614 | +59 |
| 36 | $N⟨^{CH_2}_{CH_2}⟩(CH_2)_3$ | $N⟨^{CH_2}_{CH_2}⟩(CH_2)_3$ | $HN(CH_2)_6NH$ | 88.9 | 606 | M.P. 198° |

TABLE Ia

| No. | Formula | Analysis | | | | | |
|---|---|---|---|---|---|---|---|
| | | C, percent | | H, percent | | N, percent | |
| | | Calculated | Found | Calculated | Found | Calculated | Found |
| 25 | $C_{28}H_{54}N_{12}$ | 66.30 | 66.13 | 9.68 | 9.55 | 30.02 | 30.02 |
| 26 | $C_{20}H_{38}N_{12}$ | 53.80 | 53.42 | 8.53 | 8.57 | 37.70 | 37.60 |
| 27 | $C_{44}H_{86}N_{12}$ | 67.62 | 67.55 | 11.00 | 11.21 | 21.53 | 21.52 |
| 28 | $C_{32}H_{62}N_{12}$ | 62.65 | 61.99 | 10.01 | 10.29 | 27.38 | 27.31 |
| 29 | $C_{46}H_{90}N_{12}$ | 68.02 | 67.91 | 11.11 | 11.38 | 20.70 | 20.86 |
| 30 | $C_{32}H_{60}N_{12}$ | 62.65 | 62.81 | 10.01 | 9.93 | 27.38 | 27.13 |
| 31 | $C_{44}H_{86}N_{12}O_2$ | 65.00 | 64.99 | 10.55 | 10.52 | 20.61 | 20.86 |
| 32 | $C_{51}H_{96}N_{12}$ | 69.88 | 69.77 | 10.97 | 11.13 | 19.19 | 19.01 |
| 33 | $C_{48}H_{94}N_{12}$ | 68.82 | 68.48 | 11.23 | 11.25 | 19.99 | 20.07 |
| 34 | $C_{100}H_{198}N_{12}$ | 76.80 | 76.11 | 12.63 | 12.64 | 10.70 | 10.97 |
| 35 | $C_{32}H_{62}N_{12}$ | 62.65 | 62.35 | 10.01 | 10.07 | 27.40 | 27.30 |
| 36 | $C_{32}H_{54}N_{12}$ | 63.48 | 63.44 | 8.90 | 8.90 | 27.70 | 27.03 |

The Table I above contains further examples of N,N',N''-substituted melamine derivatives according to the invention of the general formula

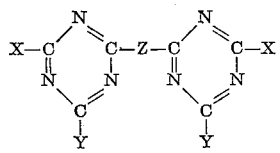

which are obtained by reacting cyanuric chloride in steps with the primary and secondary organic monoamines corresponding to X and Y and with the primary and secondary diamines corresponding to Z as fully described in Example 1. Column 5 of Table I shows the yield attained in the last step in percent of the theoretical, column 6 gives the molecular weight and column 7 the solidification point.

In Table Ia, above, column 2 contains the formula of the compounds given in Table I, and columns 3 to 8 show the results of elementary analysis for carbon, hydrogen and nitrogen compared with the theoretical content.

Table II shows the physical data of the compounds from which the stability of the melamine derivatives according to the invention at high temperature and their viscosity behaviour can be seen. Columns 2 and 3 give the viscosity measured at 100° F. (=37.8° C.) and 210° F. (98.9° C.), and column 4 shows the so-called ASTM slope.

The meaning of the ASTM slope is as follows: If in a co-ordinate system, the temperature (in degrees Fahrenheit) is given as the abscissa and the natural log of the viscosity (in centistokes) is given as ordinate, then a plot is formed which, for practical purposes, can be regarded as straight. Thus the viscosity for the whole temperature range can be interpolated from two points determined by experiment (conventionally the viscosities at 100° F. and 210° F. are determined). The slope of this plot is a standard for the dependency of the viscosity on temperature. Therefore, the ASTM slope is the quotient of the ordinate over the abscissa of the two points measured in cm. which are obtained by plotting the actual viscosity values at various temperatures in the ASTM chart. The "ASTM Standard Viscosity-Temperature Charts for liquid petroleum products" (Method D341) are standard graphs which are in close resemblance to the co-ordinate system described above. ASTM is an abbreviation for American Society for Testing Materials, 1916 Race Street, Philadelphia, Pa. USA.

Columns 5 and 6 show the loss in weight in percentage within 6 hours incurred by a sample of 25 ccm. on heating to 380 or 400° C. in a glass test tube of about 25 mm. diameter with simultaneous introduction of nitrogen (2 litres per hour).

Column 7 shows the alteration in the viscosity in percentage measured at 210° F. incurred by the sample on heating for 6 hours as described above.

TABLE II

| No. | Viscosity in centistokes at— | | ASTM slope | Loss in weight after 6 hours at— | | Percentage of viscosity alteration after 6 hours in centistokes at 210° F. |
|---|---|---|---|---|---|---|
| | 100° F. (37.8° C.) | 210° F. (98.8° C.) | | ° C. | Percent | |
| 1 | 12,160 | 120.9 | 0.740 | 380 | 2.34 | −5.4 |
| | | | | 400 | 7.42 | −4.6 |
| 2 | | 2,794 | | 380 | 4.41 | −81.3 |
| | | | | 400 | 15.97 | −91.9 |
| 3 | | 129.5 | | 380 | 2.61 | +21.3 |
| | | | | 400 | 8.74 | +118.0 |
| 4 | | 101.7 | | 380 | 6.00 | +1.89 |
| | | | | 400 | 18.05 | +8.95 |
| 5 | 1,847 | 58.76 | 0.675 | 380 | 14.80 | −43.0 |
| | | | | 400 | 30.80 | +12.36 |
| 6 | | 290.7 | | 380 | 3.42 | +18.6 |
| | | | | 400 | 10.94 | −6.1 |
| 7 | | 347.9 | | 380 | 3.96 | +3.4 |
| | | | | 400 | 11.76 | −23.8 |
| 8 | | 115.5 | | 380 | 2.69 | −5.62 |
| | | | | 400 | 9.84 | +3.03 |
| 9 | | 93.28 | | 380 | 2.54 | −2.34 |
| | | | | 400 | 8.32 | +1.23 |
| 10 | | | | 380 | 1.81 | |
| | | | | 400 | 5.50 | |
| 11 | | 306.4 | | 380 | 1.92 | −4.28 |
| | | | | 400 | 5.84 | +30.10 |
| 12 | | 253.0 | | 380 | 6.00 | −67.4 |
| | | | | 400 | 18.19 | −70.7 |
| 13 | | | | 380 | 7.15 | |
| | | | | 400 | 22.15 | |
| 14 | | | | 380 | 3.68 | |
| | | | | 400 | 22.54 | |
| 16 | | | | 380 | 2.51 | |
| | | | | 400 | 7.04 | |
| 17 | | | | 380 | 5.42 | |
| | | | | 400 | 16.67 | |
| 18 | | | | 380 | 6.07 | |
| | | | | 400 | 17.95 | |
| 20 | 16,860 | 129.5 | 0.781 | 380 | 1.43 | −4.5 |
| | | | | 400 | 5.51 | −5.8 |
| 28 | 3,910 | 101.2 | 0.644 | 380 | 3.00 | −1.1 |
| | | | | 400 | 10.80 | −7.3 |
| 29 | 24,480 | 1,226 | 0.822 | 380 | 2.02 | +15.4 |
| | | | | 400 | 6.80 | +48.7 |
| 30 | 3,664 | 95.5 | 0.650 | 380 | 2.64 | +11.1 |
| | | | | 400 | 11.10 | +14.6 |
| 31 | | 189.7 | | 380 | 3.53 | −10.8 |
| | | | | 400 | 6.94 | +5.5 |
| 32 | 2,183 | 683 | 0.657 | 380 | 15.42 | −36.15 |
| | | | | 400 | 29.55 | +115.3 |
| 33 | | 1,851.0 | | 380 | 3.11 | +10.1 |
| | | | | 400 | 7.88 | −21.34 |
| 34 | | 84.82 | | 380 | 5.83 | −27.5 |
| | | | | 400 | 16.44 | −49.9 |
| 35 | | 46.35 | | 380 | 3.92 | −12.9 |
| | | | | 400 | 14.72 | |
| 36 | | 118.8 | | 380 | 3.8 | +6.24 |
| | | | | 400 | 17.0 | |
| 37 | | 306.4 | | 380 | 1.92 | −4.28 |
| | | | | 400 | 5.86 | +30.1 |

Example 37

50 parts of the compound of Example 1 which has a viscosity of 12.160 centistokes at 37.8° and 120.9 centistokes at 98.8° are stirred with 50 parts of a polypropylene glycol sebacic acid (Reoplex 100 marketed by The Geigy Co. Limited, Manchester, England). The mixture has the good lubricant properties of the components and the viscosity of the mixture is 6.263 centistokes at 37.8° and 265 centistokes at 98.8°. From this the ASTM slope is calculated at 0.492.

The application possibilities of the melamine compounds used are considerably broadened by this reduction of the ASTM slope.

Example 38

3 parts of copper phthalocyanine are stirred in 25 ccm. of benzene in an "Ultraturax" mixing apparatus (Janke & Kunkel, Stauffen, Baden, Western Germany). 9 parts of the mixture obtained according to Example 1 are slowly added to this mixture and the whole is stirred for 45 minutes. The homogeneous mass so obtained is worked on a glass surface with a spatula until the excess benzene has evaporated.

The mass obtained is heated for 45 minutes at 150° and, after cooling, is again worked with a spatula.

A good grease which can be well worked is obtained.

Example 39

99 parts of the compound according to Example 24 of Table I and 1 part of iminodibenzyl are stirred together until the latter has completely dissolved. The mixture obtained has improved stability to oxidation when compared with the pure triazine compound.

Similar results are obtained if instead of the above compound, the other synthesised compounds mentioned in this document are used with the usual antioxidants most useful for the intended purpose in amounts of 0.01 to 5%.

Example 40

The lubricity of a representative lubricant according to the invention and that of four different synthetic lubricants commercially available (used as comparison) was measured in a Precision Shell four ball apparatus. This apparatus ran for 30 minutes at a speed of 1480 revolution per minute with a load of 40 kg., using ½ inch steel balls SKF A-quality. The starting temperature was 22° C. The results are summarized in the following table:

TABLE III

| Substance used: | Diameter of abrasion calotte in mm. |
|---|---|
| Example No. 1 | 0.612 |
| Di-3,5,5-trimethyl-hexyl-sebacate | 0.817 |
| Di-2-ethylhexyl-sebacate | 0.850 |
| Di-2-ethylhexyl-adipat | 0.915 |
| Methylphenyl silicone (MS 550 of Midland Silicones Ltd.) | 1,953 |
| (In this test there was no lubrication even after 2½ minutes) | |

Each of the above values is the average of three tests.

Example 41

A wood sealing composition is prepared by mixing intimately together:

| | Grams |
|---|---|
| Cellulose acetobutyrate, as film former | 125 |
| 1.6 - bis - [2',4' - bis - ethylamino - s-triazinyl-(6')-amino]-hexane (Example 26) | 100 |
| Castor oil | 15 |
| Dioctyl phthalate | 10 |
| Dibutyl phthalate | 5 |
| Toluene | 275 |
| Aqueous ethanol (96% volume $C_2H_5OH$) | 180 |
| Butanol | 40 |
| Cellosolve | 250 |

This composition and similar ones obtained by replacing the triazine derivative mentioned above by that of Examples 8 or 21 are excellently suitable for the sealing of wooden floors and the like.

We claim:

1. A compound of the formula

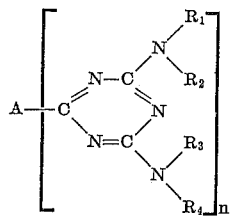

wherein:
A is the n-valent radical of a saturated aliphatic hydrocarbon polyamine having a total of from 2 to 5 nitrogen atoms all of which are acylatable and are separated from each other by at least two carbon atoms, the total number of carbon atoms of which polyamine is at least 2 and at most 20.

$n$ is a positive integer ranging from 2 to 5, each triazine moiety in the above formula being linked to one of said acylatable nitrogen atoms of A, each of $R_1$ and $R_3$ is, independently of the other, a member selected from the group consisting of hydrogen and alkyl of maximally 18 carbon atoms, and each of $R_2$ and $R_4$ is, independently of the other, a member selected from the group consisting of alkyl with maximally 18 carbon atoms, monocyclic aralkyl in which the alkyl part has maximally 4 carbon atoms, phenyl, chlorophenyl, fluorophenyl, bromophenyl, and alkylphenyl in which alkyl has maximally 12 carbon atoms, and each of the pairs $R_1$ and $R_2$ taken together, as well as $R_3$ and $R_4$, taken together is a member selected from the group consisting of tetramethyleno, pentamethyleno, hexamethyleno, morpholino and N-methylpiperazino.

2. A compound as defined in claim 1, wherein each of the groupings

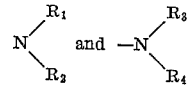

is dialkylamino, in which each alkyl has from 2 to 18 carbon atoms.

3. A compound of the formula

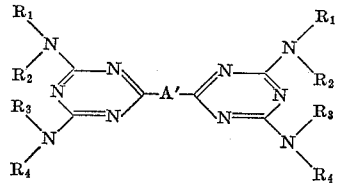

wherein:
A' is a divalent radical of a saturated aliphatic diaminoether having from one to two non-adjacent hetero atoms selected from the group consisting of oxygen and sulfur in the aliphatic portion between the amino groups, each amino group being separated from the next adjacent hetero atom by at least two carbon atoms, the total number of carbon atoms of which diaminoether does not exceed 20, said diaminoether being a member selected from the group consisting of unsubstituted and lower alkyl-substituted diaminoethers.

each triazine moiety in the above formula being linked to one of said acylatable nitrogen atoms of A', each of $R_1$ and $R_3$ is, independently of the other, a member selected from the group consisting of hydrogen and alkyl of maximally 18 carbon atoms, and 8. A compound of the formula

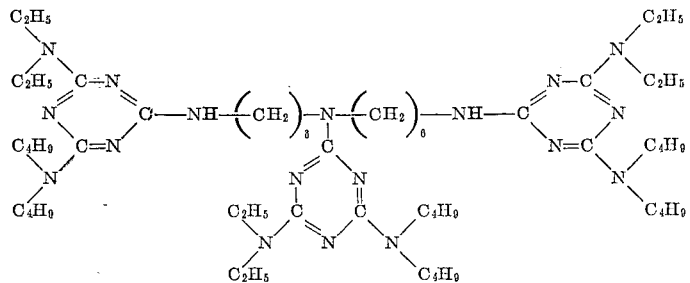

each of $R_2$ and $R_4$ is, independently of the other, a member selected from the group consisting of alkyl with maximally 18 carbon atoms, monocyclic aralkyl in which the alkyl part has maximally 4 carbon atoms, phenyl, chlorophenyl, fluorophenyl, bromophenyl, and alkylphenyl in which alkyl has maximally 12 carbon atoms, and each of the pairs $R_1$ and $R_2$ taken together, as well as $R_3$ and $R_4$, taken together is a member selected from the group consisting of tetramethyleno, pentamethyleno, hexamethyleno, morpholino and N-methylpiperazino.

4. A compound of the formula

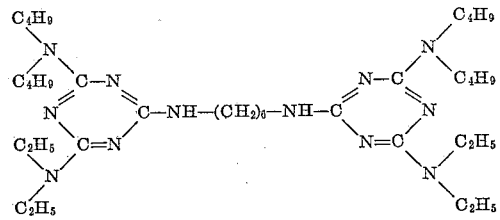

5. A compound of the formula

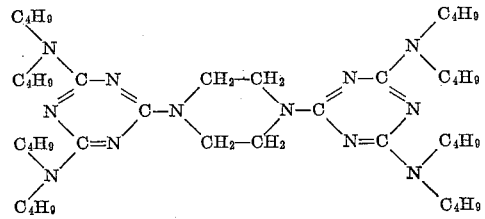

6. A compound of the formula

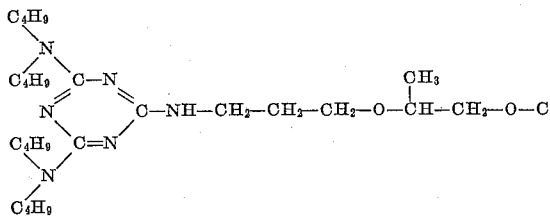

7. A compound of the formula

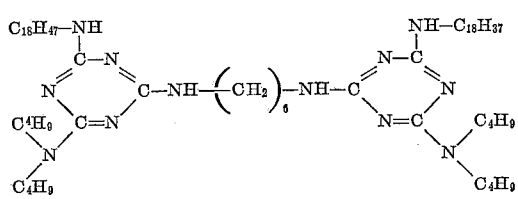

9. A compound of the formula

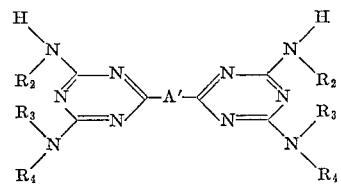

wherein:
A' is a divalent radical of a saturated aliphatic diaminoether having from one to two non-adjacent hetero atoms selected from the group consisting of oxygen and sulfur in the aliphatic portion between the amino groups, each amino group being separated from the next adjacent hetero atom by at least two carbon atoms, the total number of carbon atoms of which diaminoether does not exceed 20, said diaminoether being a member selected from the group consisting of unsubstituted and lower alkyl-substituted diaminoethers, each triazine moiety in the above formula being linked to one of said acylatable nitrogen atoms of A', $R_3$ is a member selected from the group consisting of hydrogen and alkyl of maximally 18 carbon atoms, and each of $R_2$ and $R_4$ is, independently of the other, a member selected from the group consisting of alkyl with maximally 18 carbon atoms, monocyclic aralkyl in which the alkyl part has maximally 4 carbon atoms, phenyl, chlorophenyl, fluorophenyl, bromophenyl, and alkylphenyl in which alkyl has maximally 12 carbon atoms, and the pair $R_3$ and $R_4$, taken together, is a member selected from the group consisting of tetramethyleno, pentamethyleno, hexamethyleno, morpholino and N-methylpiperazino.

References Cited

UNITED STATES PATENTS 2,544,071   3/1951   Dudley _____ 260—249.6
3,206,407   9/1965   Lutwack _____ 260—249.6 X WALTER A. MODANCE, *Primary Examiner.*

JOHN M. FORD, *Assistant Examiner.*

UNITED STATES PATENT OFFICE
CERTIFICATE OF CORRECTION

Patent No. 3,322,763                      May 30, 1967

Joachim Dazzi et al.

It is hereby certified that error appears in the above numbered patent requiring correction and that the said Letters Patent should read as corrected below.

Column 7, formula of Example 2, the upper right-hand portion of the formula should appear as shown below instead of as in the patent:

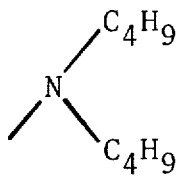

column 10, line 34, for "0.07" read -- 0.01 --; column 12, in the formula of Example 11, the upper right-hand side of the formula should appear as shown below instead of as in the patent:

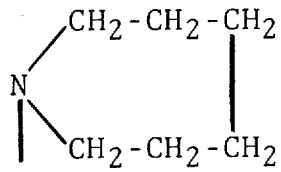

same column 12, in the formula of Example 13, the lower center portion of the formula should appear as shown below instead of as in the patent:

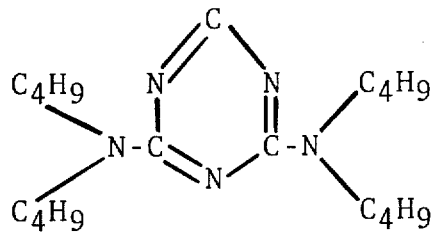

column 13, in the formula of Example 15, the triazine ring in the left-hand side of the formula should appear as shown below instead of as in the patent:

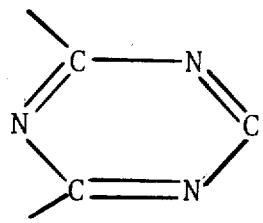

column 14, in the formula of Example 16, the lower left-hand side of the formula should appear as shown below instead of as in the patent:

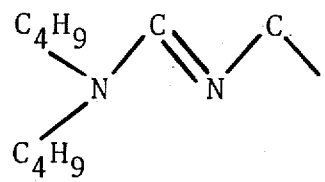

column 23, in the formula of claim 7, for the upper left-hand side of the formula reading $C_{18}H_{47}-NH$   read   $C_{18}H_{37}-NH$ Signed and sealed this 17th day of September 1968.

(SEAL)
Attest:

EDWARD M. FLETCHER, JR.
Attesting Officer

EDWARD J. BRENNER
Commissioner of Patents